United States Patent
VanBlon et al.

(10) Patent No.: US 10,860,094 B2
(45) Date of Patent: Dec. 8, 2020

(54) EXECUTION OF FUNCTION BASED ON LOCATION OF DISPLAY AT WHICH A USER IS LOOKING AND MANIPULATION OF AN INPUT DEVICE

(71) Applicant: Lenovo (Singapore) Pte. Ltd., New Tech Park (SG)

(72) Inventors: Russell Speight VanBlon, Raleigh, NC (US); Jianbang Zhang, Cary, NC (US); John Weldon Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 947 days.

(21) Appl. No.: 14/643,505

(22) Filed: Mar. 10, 2015

(65) Prior Publication Data
US 2016/0266642 A1   Sep. 15, 2016

(51) Int. Cl.
*G06F 3/01* (2006.01)
*G06F 3/0482* (2013.01)
(Continued)

(52) U.S. Cl.
CPC .............. *G06F 3/013* (2013.01); *G06F 3/017* (2013.01); *G06F 3/0346* (2013.01);
(Continued)

(58) Field of Classification Search
CPC ........ G06F 3/013; G06F 3/0482; G06F 3/017; G06F 3/0346; G06F 3/03545; G06F 3/04842; G06F 3/04883
See application file for complete search history.

(56) References Cited

U.S. PATENT DOCUMENTS

| 2,510,344 A | 6/1950 | Law |
| 2,567,654 A | 9/1951 | Siezen |

(Continued)

FOREIGN PATENT DOCUMENTS

| DE | 10310794 | 9/2004 |
| DE | 69937592 | 10/2008 |

(Continued)

OTHER PUBLICATIONS

Logitech, Customizing Mouse Buttons with Logitech Control Center Software, http://support.logitech.com/en_us/article/26975, published 2014, pp. 1-3. (Year: 2014).*

(Continued)

*Primary Examiner* — Tan H Tran
(74) *Attorney, Agent, or Firm* — John M. Rogitz; John L. Rogitz

(57) ABSTRACT

In one aspect, an apparatus includes a processor, a sensor accessible to the processor, a display accessible to the processor, and memory accessible to the processor. The memory bears instructions executable by the processor to receive first input from the sensor, and based on the first input, identify a location on the display at which a user is looking. The instructions are also executable to receive second input from an input device in communication with the apparatus and, responsive to receipt of the second input and based on the location on the display, execute a function at the apparatus regardless of a location of the input device when the second input was received.

20 Claims, 7 Drawing Sheets

(51) Int. Cl.
*G06F 3/0484* (2013.01)
*G06F 3/0354* (2013.01)
*G06F 3/0346* (2013.01)
*G06F 3/0488* (2013.01)

(52) U.S. Cl.
CPC ...... *G06F 3/03545* (2013.01); *G06F 3/04842* (2013.01); *G06F 3/04883* (2013.01)

(56) References Cited

U.S. PATENT DOCUMENTS

| | | |
|---|---|---|
| 3,418,426 A | 12/1968 | Schlegel et al. |
| 3,628,854 A | 12/1971 | Jampolsky |
| 4,082,433 A | 4/1978 | Appeldorn et al. |
| 4,190,330 A | 2/1980 | Berreman |
| 4,577,928 A | 3/1986 | Brown |
| 5,514,861 A | 5/1996 | Swartz et al. |
| 5,579,037 A | 11/1996 | Tahara et al. |
| 5,581,484 A | 12/1996 | Prince |
| 5,583,702 A | 12/1996 | Cintra |
| 6,046,847 A | 4/2000 | Takahashi |
| 6,607,134 B1 | 8/2003 | Bard et al. |
| 6,822,639 B1 | 11/2004 | Silverbrook et al. |
| 8,570,273 B1 | 10/2013 | Smith |
| 2003/0214481 A1 | 11/2003 | Xiong |
| 2004/0160419 A1 | 8/2004 | Padgitt |
| 2004/0169638 A1 | 9/2004 | Kaplan |
| 2005/0116929 A1* | 6/2005 | Molander ............ G06F 3/013 345/157 |
| 2005/0257166 A1 | 11/2005 | Tu |
| 2006/0001656 A1* | 1/2006 | LaViola, Jr. ........ G06F 3/04883 345/179 |
| 2006/0012567 A1 | 1/2006 | Sicklinger |
| 2006/0061663 A1 | 3/2006 | Park |
| 2006/0139175 A1 | 6/2006 | Cosier |
| 2006/0267957 A1 | 11/2006 | Kolmykov-Zotov et al. |
| 2006/0267958 A1 | 11/2006 | Kolmykov-Zotov et al. |
| 2006/0282574 A1 | 12/2006 | Zotov et al. |
| 2007/0063992 A1 | 3/2007 | Lundquist |
| 2007/0262958 A1 | 11/2007 | Cai et al. |
| 2008/0136775 A1 | 6/2008 | Conant |
| 2009/0065578 A1 | 3/2009 | Peterson et al. |
| 2009/0146951 A1 | 6/2009 | Welland |
| 2009/0204410 A1 | 8/2009 | Mozer et al. |
| 2009/0259349 A1 | 10/2009 | Golenski |
| 2009/0315740 A1 | 12/2009 | Hildreth et al. |
| 2009/0322685 A1 | 12/2009 | Lee |
| 2010/0053082 A1* | 3/2010 | Hu .................... G06F 3/0346 345/158 |
| 2010/0079508 A1 | 4/2010 | Hodge et al. |
| 2010/0156783 A1 | 6/2010 | Bajramovic |
| 2010/0171720 A1 | 7/2010 | Craig et al. |
| 2010/0201625 A1 | 8/2010 | Urbach |
| 2010/0211918 A1 | 8/2010 | Liang et al. |
| 2011/0007035 A1 | 1/2011 | Shai |
| 2011/0065451 A1 | 3/2011 | Danado et al. |
| 2011/0210931 A1 | 9/2011 | Shai |
| 2012/0075173 A1 | 3/2012 | Ashbrook et al. |
| 2012/0086636 A1 | 4/2012 | Chen |
| 2012/0092277 A1 | 4/2012 | Momchilov |
| 2012/0126972 A1 | 5/2012 | Rott et al. |
| 2012/0149309 A1 | 6/2012 | Hubner et al. |
| 2012/0220311 A1 | 8/2012 | Rodriguez et al. |
| 2012/0268268 A1 | 10/2012 | Bargero |
| 2013/0016064 A1 | 1/2013 | Lee |
| 2013/0021459 A1 | 1/2013 | Vasilieff et al. |
| 2013/0044042 A1 | 2/2013 | Olsson et al. |
| 2013/0063107 A1 | 3/2013 | Kang et al. |
| 2013/0135233 A1 | 5/2013 | Wang et al. |
| 2013/0145304 A1* | 6/2013 | DeLuca .................. G06F 3/013 715/781 |
| 2013/0170755 A1 | 7/2013 | Dalton et al. |
| 2013/0246663 A1 | 9/2013 | Raveendran et al. |
| 2013/0307769 A1 | 11/2013 | Sharma et al. |
| 2013/0307771 A1 | 11/2013 | Parker et al. |
| 2014/0132410 A1 | 5/2014 | Chang |
| 2014/0132512 A1 | 5/2014 | Sainz-Garcia |
| 2014/0176813 A1* | 6/2014 | Conness ................. H04N 5/60 348/738 |
| 2014/0184550 A1* | 7/2014 | Hennessey ............. G06F 3/013 345/173 |
| 2014/0204029 A1* | 7/2014 | Lopez .................... G06F 3/013 345/163 |
| 2014/0247232 A1* | 9/2014 | George-Svahn ......... G06F 3/02 345/173 |
| 2014/0285416 A1 | 9/2014 | Priyantha et al. |
| 2014/0317524 A1 | 10/2014 | VanBlon et al. |
| 2015/0067560 A1* | 3/2015 | Cieplinski ........... G06F 3/04842 715/765 |
| 2015/0067580 A1* | 3/2015 | Um ..................... G06F 3/0481 715/781 |
| 2015/0130740 A1* | 5/2015 | Cederlund ............. G06F 3/014 345/173 |
| 2015/0304251 A1* | 10/2015 | Greenberg ............ H04L 51/046 715/752 |
| 2016/0128568 A1* | 5/2016 | Bellamy ................ A61B 3/113 351/209 |

FOREIGN PATENT DOCUMENTS

| | | |
|---|---|---|
| EP | 0880090 | 11/1998 |
| WO | 2004051392 | 6/2004 |

OTHER PUBLICATIONS

Wascom, Pen Display Software User's Manual, Version 1.0, Jun. 12, 2008, pp. 1-8. (Year: 2008).*

Russell Speight VanBlon, Neal Robert Caliendo Jr.; "Automatic Magnification and Selection Confirmation" file history of related U.S. Appl. No. 14/322,119, filed Jul. 2, 2014.

Russell Speight VanBlon, Neal Robert Caliendo Jr.; "Magnification Based on Eye Input" file history of related U.S. Appl. No. 14/546,962, filed Nov. 18, 2014.

Russell Speight VanBlon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight VanBlon, Rod D. Waltermann, "Devices and Methods to Receive Input at a First Device and Present Output in Response on a Second Device Different from the First Device" file history of related U.S. Appl. No. 14/095,093, filed Dec. 3, 2013.

Jonathan Gaither Knox, Rod D. Waltermann, Liang Chen, Mark Evan Cohen, "Initiating Personal Assistant Application Based on Eye Tracking and Gestures" file history of related U.S. Appl. No. 14/095,235, filed Dec. 3, 2013.

Nathan J. Peterson, John Carl Mese, Russell Speight VanBlon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight VanBlon, Rod David Waltermann, John Carl Mese, Arnold S. Weksler, Nathan J. Peterson, "Detecting Noise or Object Interruption in Audio Video Viewing and Altering Presentation Based Thereon" file history of related U.S. Appl. No. 14/158,990, filed Jan. 20, 2014.

Russell Speight VanBlon, Axel Ramirez Flores, Jennifer Greenwood Zawacki, Alan Ladd Painter, "Skin Mounted Input Device" file history of related U.S. Appl. No. 14/162,115, filed Jan. 23, 2014.

Axel Ramirez Flores, Rod David Waltermann, James Anthony Hunt, Bruce Douglas Gress, James Alan Lacroix, "Glasses with Fluid-Fillable Membrane for Adjusting Focal Length of One or More Lenses of the Glasses" file history of related U.S. Appl. No. 14/453,024, filed Aug. 6, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

(56) References Cited

OTHER PUBLICATIONS

Rod David Waltermann, John Carl Mese, Nathan J. Peterson, Arnold S. Weksler, Russell Speight VanBlon, "Movement of Displayed Element from One Display to Another" file history of related U.S. Appl. No. 14/550,107, filed Nov. 21, 2014.
Amy Leigh Rose, Nathan J. Peterson, John Scott Crowe, Bryan Loyd Young, Jennifer Lee-Baron, "Presentation of Data on an at Least Partially Transparent Display Based on User Focus" file history of U.S. Appl. No. 14/548,938, filed Nov. 20, 2014.
Rod David Waltermann, Russell Speight VanBlon, Nathan J. Peterson, Arnold S. Weksler, John Carl Mese, "Authentication Based on Body Movement" file history of related U.S. Appl. No. 14/643,132, filed Mar. 10, 2015.
Grigori Zaitsev, Russell Speight VanBlon, "Projection of Images on Side Window of Vehicle" filed history of related U.S. Appl. No. 14/639,263, filed Mar. 5, 2015.
Scott Wentao Li, Russell Speight Vanblon, Liang Chen, "Presentation of Audio Based on Source" file history of related U.S. Appl. No. 14/661,143, filed Mar. 18, 2015.
Amy Leigh Rose, Nathan J. Peterson, John Scott Crowe, Bryan Loyd Young, "Prevention of Light from Exterior to a Device Having a Camera from Being Used to Generate an Image Using the Camera Based on the Distance of a User to the Device'" file history of related U.S. Appl. No. 14/659,803, filed Mar. 17, 2015.
David W. Douglas, Joseph David Plunkett, "Camera That Uses Light from Plural Light Sources Disposed on a Device" file history of related U.S. Appl. No. 14/670,753, filed Mar. 27, 2015.
Insight News, "Electronic-lens company PixelOptics is bankrupt", htttp://www.insightnews.com.au/_blog/NEWS_NOW!/post/lens/electronic-lens-company-pixeloptics-is-bankrupt/. Dec. 12, 2013.
Wikipedia, "Extended Display Identification Data", Definition; http://en.wikipedia.org/wiki/Extended_display_Identification_data, printed from website Oct. 10, 2014.
Extron , "Digital Connection, Understanding EDID—Extended Display Identification Data", Fall 2009, www.20extron.com.
"Relationship Between Inches, Picas, Points, Pitch, and Twips", Article ID: 76388; http://support2.microsoft.com/KB/76388. Printed Oct. 10, 2014.
Wikipedia, "Polarizer" Definition; http://en.wikipedia.org/wiki/Polarizer, printed from website Jan. 14, 2015.
Wikepedia, "Smart Glass" Definition, http://en.wikipedia.org/wiki/Smart_glass, printed from website Jan. 14, 2015.
Wikipedia, "Microphone array", definition, http://en.wikipedia.org/wiki/Microphone_array, printed from website Jan. 22, 2015.
Wikipedia, "Beamforning", definition; http://en.wikipedia.org/wiki/Beamforming, printed from website Jan. 22, 2015.
"Understanding & Using Directional Microphones", http://www.soundonsound.com/sos/sep00/articles/direction.htm; Published in SOS Sep. 2000.
Wikipedia, "Microphone", definition; http://en.wilipedia.org/wkik/microphone, printed from website Jan. 22, 2015.
Thalmiclabs, "Myo-Tech Specs", http://www.thalmic.com/en/myo/techspecs, printed from website Jan. 27, 2015.
Thalmiclabs, "Myo Gesture Control Armband" http://www.thalmic.com/en/myo, printed from website Jan. 27, 2015.
Wikipedia, "Electromyography", definition; http://en.wikipedia.org/wiki/Electromyogrpahy, printed from website Jan. 27, 2015.
ISource: "Raise to Speak Makes Siri Wonderfully Useful (Once You Know How to Use It)", http:///isource.com/10/01/raise-to-speak-makes-siri-wonderfully-useful-once-you-know-how-to-use-it./ Web printout Nov. 15, 2013.
Tactus Technology, "Taking Touch Screen Interfaces Into A New Dimension", 2012 (13 pages).
Arthur Davis, Frank Kuhnlenz, "Optical Design Using Fresnel Lenses, Basic Principles and some Practical Examples" Optik & Photonik, Dec. 2007.
Superfocus, "See the World in Superfocus Revolutionary Eyeglasses Give You the Power To Focus Your Entire View At Any Distance", http://superfocus.com/eye-care-practitioners, printed from website Jun. 24, 2014.
Darren Quick, "PixelOptics to Launch 'world's first electronic focusing eyewear'", http://www.gizmag.com/pixeloptics-empower-electroni-focusing-glasses/17569/. Jan. 12, 2011.
Russell Speight VanBlon, Axel Ramirez Flores, Jennifer Greenwood Zawacki, Alan Ladd Painter, "Skin Mounted Input Device", Final Office Action dated Jun. 25, 2015.
Russell Speight VanBlon, Axel Ramirez Flores, Jennifer Greenwood Zawacki, Alan Ladd Painter, "Skin Mounted Input Device", related U.S. Appl. No. 14/162,115, Applicant's response to Final Office Action filed Aug. 10, 2015.
Russell Speight VanBlon, Axel Ramirex Flores, Jennifer Greenwood Zawacki, Alan Ladd Painter, "Skin Mounted Input Device", related U.S. Appl. No. 14/162,115, Non-Final Office Action dated Sep. 1, 2015.
Russell Speight VanBlon, Jianbang Zhang, John Weldon Nicholson, "Execution of Function Based on Location of Display at Which A User is Looking and Manipulation of an Input Device", related U.S. Appl. No. 14/643,505, Applicant's response to Non-Final Office Action filed Oct. 15, 2015.
Russell Speight VanBlon, Axel Ramirex Flores, Jennifer Greenwood Zawacki, Alan Ladd Painter, "Skin Mounted Input Device", related U.S. Appl. No. 14/162,115, Final Office Action dated Nov. 13, 2015.
Russell Speight VanBlon, Axel Ramirex Flores, Jennifer Greenwood Zawacki, Alan Ladd Painter, "Skin Mounted Input Device", related U.S. Appl. No. 14/162,115, Applicant's response to Final Office Action filed Jan. 5, 2016.
Russell Speight VanBlon, Axel Ramirex Flores, Jennifer Greenwood Zawacki, Alan Ladd Painter, "Skin Mounted Input Device", related U.S. Appl. No. 14/162,115, Non-Final Office Action dated Jan. 22, 2016.
Russell Speight VanBlon, Axel Ramirex Flores, Jennifer Greenwood Zawacki, Alan Ladd Painter, "Skin Mounted Input Device", related U.S. Appl. No. 14/162,115, Applicant's response to Non-Final Office Action filed Apr. 7, 2016.
Russell Speight Vanblon, Axel Ramirez Flores, Jennifer Greenwood Zawacki, Alan Ladd Painter, "Skin Mounted Input Device", related pending U.S. Appl. No. 14/162,115 final office action dated Apr. 22, 2016.
Livescribe :: Never Miss A Word. Retrieved on Jan. 20, 2015 from http://www.livescrive.com/en-us/.
Livescrive :: Never Miss A Word. "What is a Pencast?" Retrieved on Jan. 20, 2015 from http://www.livescrive.com/en-us/pencasts/.
VibeWrite Lemstift 'Jules Verne Edition', Retrieved on Jan. 20, 2015 from http://vibewrite.com/shop/index.php?route=product/product&path=59&product_id=52.
Russell Speight VanBlon, Axel Ramirex Flores, Jennifer Greenwood Zawacki, Alan Ladd Painter, "Skin Mounted Input Device", related U.S. Appl. No. 14/162,115, filed Jan. 23, 2014, Non-Final Office Action dated May 13, 2015.
Russell Speight VanBlon, Axel Ramirex Flores, Jennifer Greenwood Zawacki, Alan Ladd Painter, "Skin Mounted Input Device", related U.S. Appl. No. 14/162,115, filed Jan. 23, 2014, Applicant's response to Non-Final Office Action filed May 15, 2015.

\* cited by examiner

EXECUTION OF FUNCTION BASED ON LOCATION OF DISPLAY AT WHICH A USER IS LOOKING AND MANIPULATION OF AN INPUT DEVICE

FIELD

The present application relates generally to executing a function at a device based on a location of a display at which a user is looking and manipulation of an input device.

BACKGROUND

As recognized herein, there may be situations where it is more convenient to provide what would otherwise be touch-based input to a display using an input device without actually contacting the display with the input device, owing to contacting the display with the input device being inconvenient and/or not preferable (e.g. based on a relatively large distance between the user and the display).

SUMMARY

Accordingly, in one aspect an apparatus includes a processor, a sensor accessible to the processor, a display accessible to the processor, and memory accessible to the processor. The memory bears instructions executable by the processor to receive first input from the sensor, and based on the first input, identify a location on the display at which a user is looking. The instructions are also executable to receive second input from an input device in communication with the apparatus and, responsive to receipt of the second input and based on the location on the display, execute a function at the apparatus regardless of a location of the input device when the second input was received.

In another aspect, a method includes receiving first input from a camera, and based on the first input, identifying a location of a display at which a person is looking. The method also includes receiving second input from a input device, where the second input is input received other than based on physical contact of the input device with the display, and based at least in part on the location and responsive to receiving the second input, performing an operation at a device.

In yet another aspect, an apparatus includes a first processor, a network adapter, and storage bearing instructions executable by a second processor for performing a task using the second processor responsive to identification of a user looking at an area of a display and receipt of input generated based on manipulation of an input device other than against the display. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
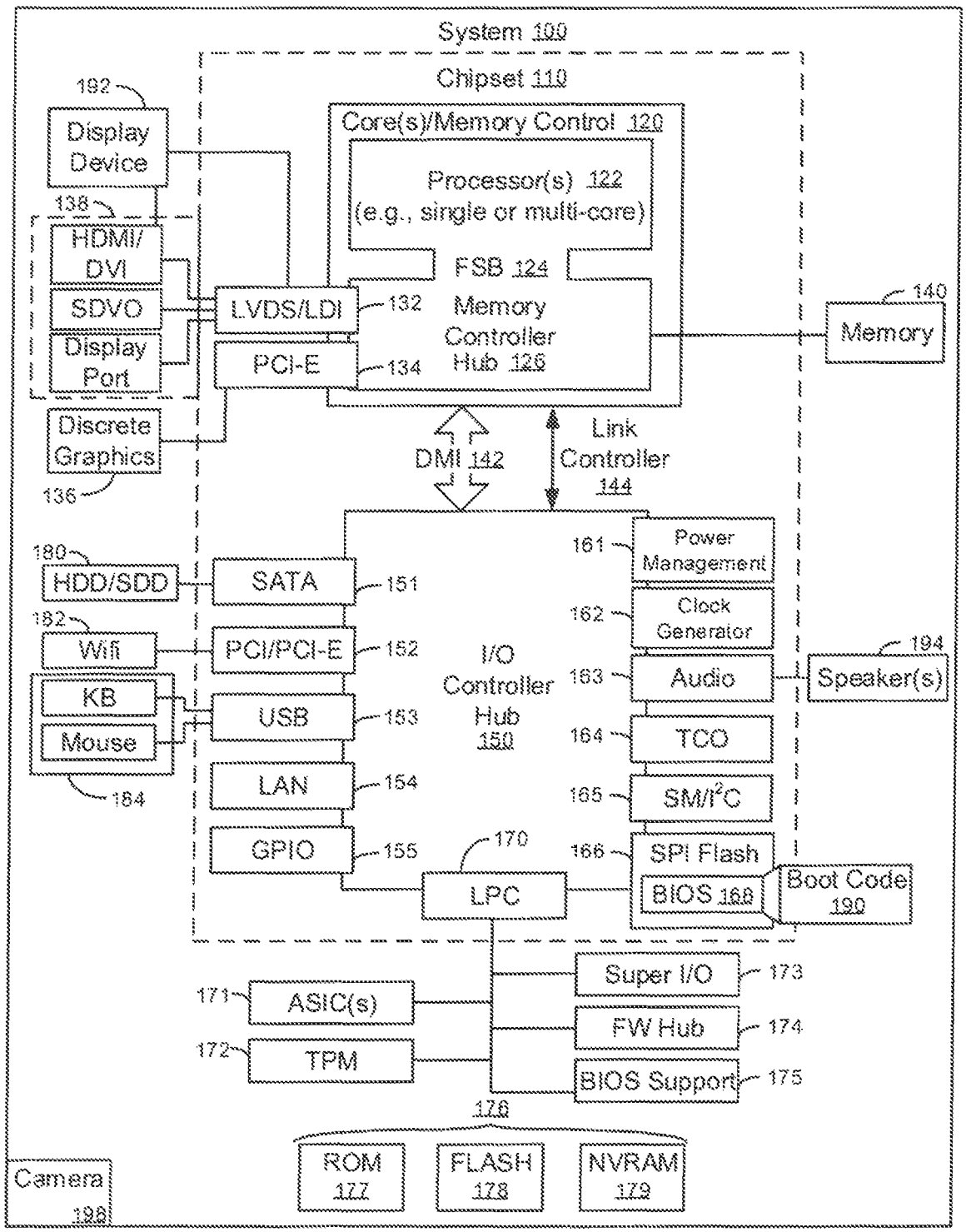
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B. C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad®, series of personal computers sold by Lenovo (US) Inc. of Morrisville, N.C. or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, a display comprising a pen digitizer for receiving input from a pen and/or stylus, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 also includes at least one sensor 198 for tracking a user's eyes and/or eye focus in accordance with present principles, such as e.g. a camera for gathering one or more images and providing input related thereto to the processor 122. The camera may be, e.g., a thermal imaging camera, a digital camera such as a webcam, a three-dimensional (3D) camera, and/or a camera integrated into the system 100 and controllable by the processor 122 to gather pictures/images and/or video.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, and an audio receiver/microphone providing input to the processor 122 e.g. based on a user providing audible input to the microphone. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
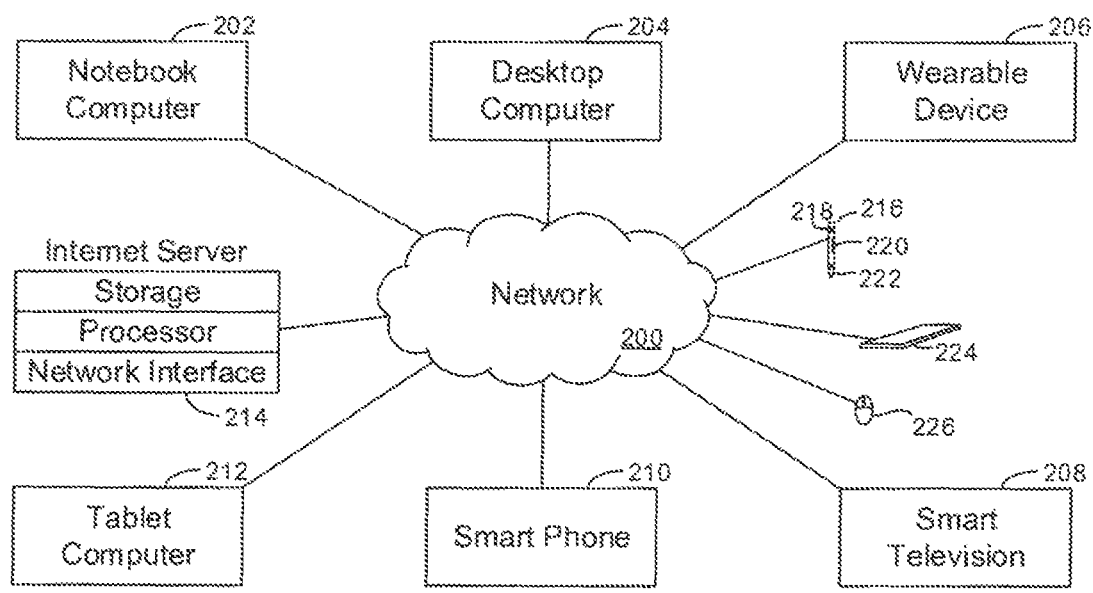
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 (such as e.g. a smart watch, a smart band and/or smart ring disposable around a person's arm or finger, a smart device engageable with at least a portion of a person's ear, etc.), a smart television (TV) 208, a smart phone 210, a tablet computer 212, and at least one input device such as e.g. a stylus 216 (comprising e.g. a button 218 generating input to the a processor of the stylus 216, a motion sensor 220 such as an accelerometer or gyroscope, and a contact sensor 222 such as e.g. a pen tip configured for sensing contact of the pen tip against an object), an input pad 224 configured for detecting contact of an object with the pad, and a mouse 226.

FIG. 2 also shows a server 214 such as e.g. an Internet server that may e.g. provide cloud storage accessible to the devices 202-212, 216, 224, and 226. It is to be understood that the devices 202-216, 224, and 226 are configured to communicate with each other over the network 200 to undertake present principles.

Figure 3:
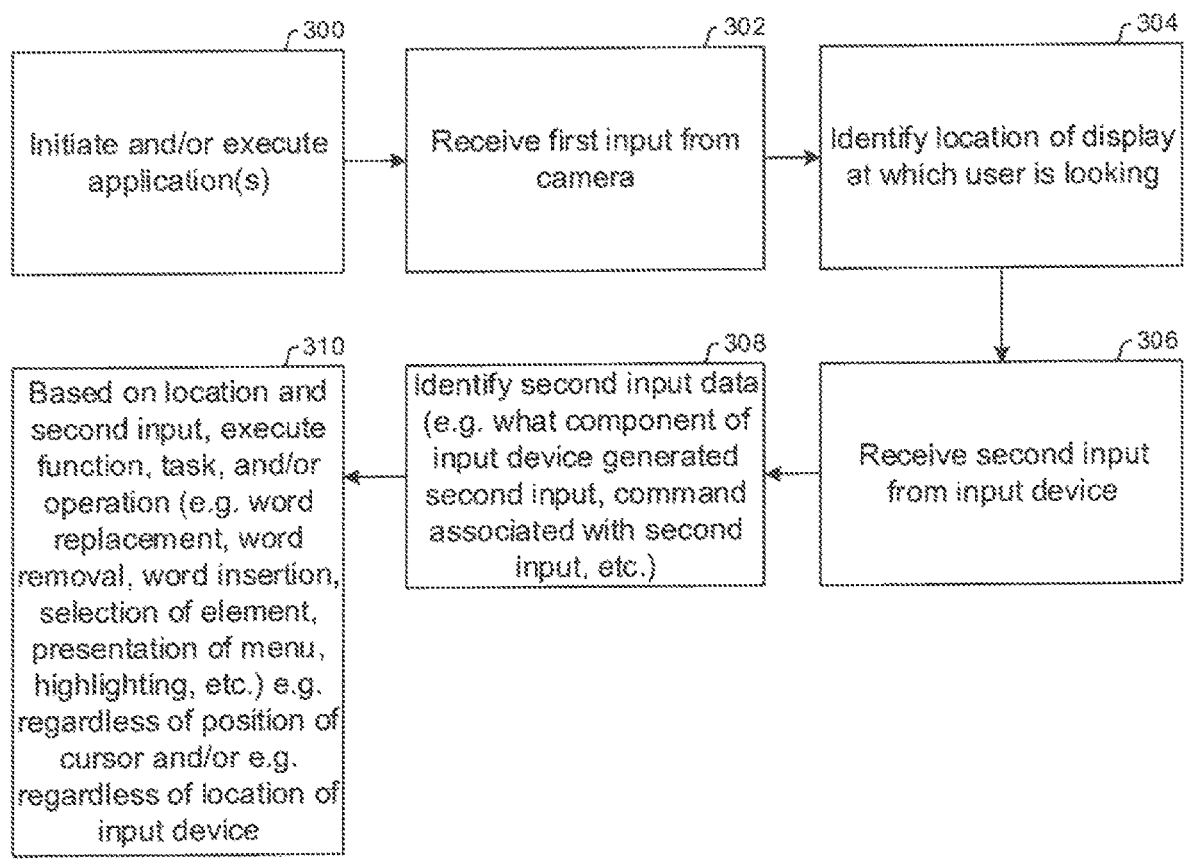
FIG. 3 is a flow chart showing an example algorithm in accordance with present principles.

Referring to FIG. 3, it shows example logic that may be undertaken by a device such as the system 100 in accordance with present principles (referred to below as the "present device"). Beginning at block 300, the logic initiates and/or executes one or more applications for undertaking present principles, such as e.g. an eye tracking application, a camera application, an input receiving application (e.g. for communicating with a wireless input device such as a stylus), a gesture recognition application, and/or a single application integrating one or more of the foregoing. Regardless, after block 300 the logic proceeds to block 302, where the logic receives first input from a camera (e.g. a series of images from the camera and/or a real-time video feed). The logic then moves to block 304, where the logic identifies at least one location on a display in communication with the present device at which a person identified from the first input is looking. The logic may identify the location applying eye tracking software and/or principles to the first input received from the camera.

After block 304 the logic of FIG. 3 moves to block 306, where the logic receives second input from an input device such as e.g. a stylus, a mouse, an electronic ring wearable around a person's finger or arm, an electronic pad, etc. Responsive to the second input that is received at block 306, the logic moves to block 308.

At block 308 the logic identifies data associated with the second input (e.g. based on the second input itself, and/or based on metadata that was transmitted from the input device with the second input), such as e.g. identification of a device type from which the second input was received (e.g. a stylus input device type, a mouse input device type), identification of a component type from which the second input of the input device was generated (e.g. a contact sensor on the input device, a motion sensor on the input device, a particular button on the input device, etc.), and/or identification of a specific command associated with the second input, the input device itself, and/or the component of the input device which generated the second input. The logic may do so at block 308 by e.g. accessing a data table stored at the present device which correlates various inputs, input device types, and/or component types with particular commands, locating an entry in the data table corresponding to the second input received at block 306, and then accessing associated data for the entry also stored in the data table.

Responsive to identification of the data at block 308, the logic moves to block 310. At block 310 the logic, based on the identified location and second input (and/or second input data identified at block 308), executes a function, task, and/or operation. Examples of such a function, task, and/or operation include, but are not limited to, replacement of a character (e.g. alphabetical or numerical character) or word presented on the display at the identified location, removal of a character or word presented on the display at the identified location, insertion of a character or word at the identified location, selection of an element presented on the display at the identified location, presentation of a menu associated with an element presented on the display at the identified location, highlighting of an element presented on the display at the identified location, etc. Note that in some embodiments, the logic may execute a function, task, and/or operation at block 308 based on the location and second input e.g. regardless of a position of a cursor presented on the display and/or regardless of the location of the input device (e.g. regardless of whether the input device was used to direct input directly to the display itself or based on contact with another object).

Figure 4:
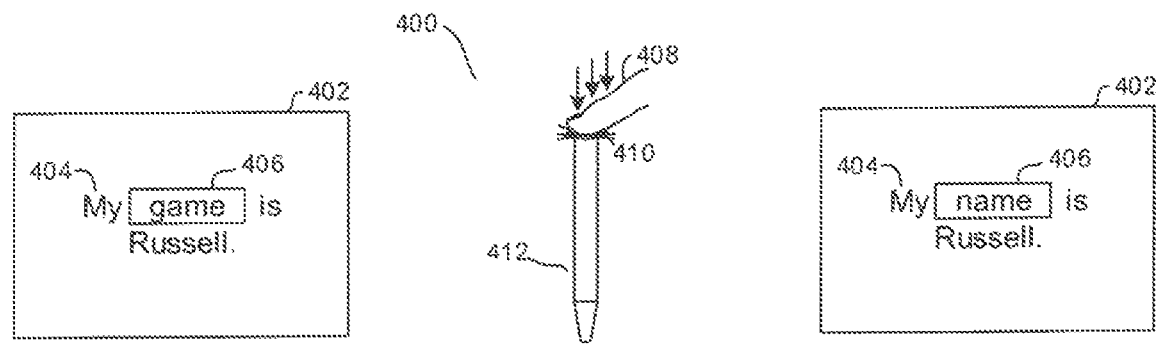
FIGS. 4-12 are example illustrations in accordance with present principles.

Before moving on to the description of FIG. 4, it is to be understood in reference to FIG. 3 that the logic may, if no display location is identifiable based on the first input (e.g. if the first input does not comprise an image of a user's face from which an area of the display being looked at may be identified), either end or undertake a function based on the second input using e.g. a current location of a cursor presented on the display.

Now in reference to FIG. 4, it shows an example illustration 400 of present principles. First, a display 402 at the left portion of FIG. 4 is shown as presenting information thereon, including text 404 comprising "My game is Russell." The device controlling the display 402 has identified area 406 comprising the word "game" as an area of the display 402 being looked at by a user, the area 406 understood to not comprise the entire area of the display 402 on which images are presentable. It is to be understood that the box shown on the display 402 corresponding to the area 406 may not actually be presented thereon and is shown in FIG. 4 for illustration, though it is to also be understood that in some embodiments, such a box may actually be presented on the display 402.

In any case, after the text 404 is presented and the area 406 identified, the middle portion of FIG. 4 shows that a user's finger 408 presses a button 410 on one end of a stylus 412. In response to receipt of input from the stylus 412 generated based on the press of the button 410 and without additional input from a user, the right portion of FIG. 4 shows that the device controlling the display 402 has caused the display 402 to replace the word "game" previously presented at area 406 with the word "name" based on e.g. the determining based on the context of the text 404 that "name" was likely what the user intended to be presented at area 406 even though "game" was previously presented. However, note that should the button 410 again be pressed, the device may cause to be presented at area 406 yet another possibility other than "name" or "game." Thus, it may be appreciated that in this example, selection of the button 410 is recognized by the device as a command to rotate or replace one item presented on the display with another.

Figure 5:
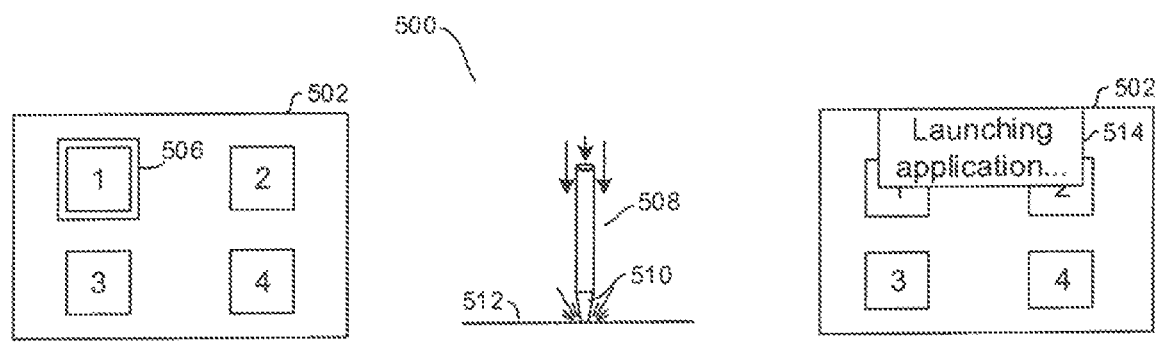

Continuing the detailed description in reference to FIG. 5, it also shows an example illustration 500 of present principles. First, a display 502 at the left portion of FIG. 5 is shown as presenting selector elements thereon (e.g. tiles, icons, files, etc.), including selector element one, selector element two, selector element three, and selector element four. The device controlling the display 502 has identified area 506 comprising selector element one as an area of the display 502 being looked at by a user, the area 506 understood to not comprise the entire area of the display 502 on which images are presentable. It is to be understood that the box corresponding to the area 506 shown on the display 502 may not actually be presented thereon and is shown in FIG. 5 for illustration, though it is to also be understood that in some embodiments, such a box may actually be presented on the display 502.

In any case, after the selector elements one through four are presented and the area 506 identified, the middle portion of FIG. 5 shows a stylus 508, under control of a user, being contacted at a tip of the stylus 508 (which includes a contact sensor 510) with a surface 512 such as e.g. a desk or counter. In response to receipt of input from the stylus 508 generated based on contact of the tip with the surface 512 as sensed by the contact sensor 510, and without additional input from a user, a function associated with selection of selector element one—in this case the launch of an application associated with selector element one—has been initiated based on the user looking at selector element one and contacting the sensor 510 with the surface 512. The right portion of FIG. 5 thus shows that the device controlling the display 502 has caused the display 502 to present box 514 which indicates that an application associated with selector element one is being launched.

Figure 6:
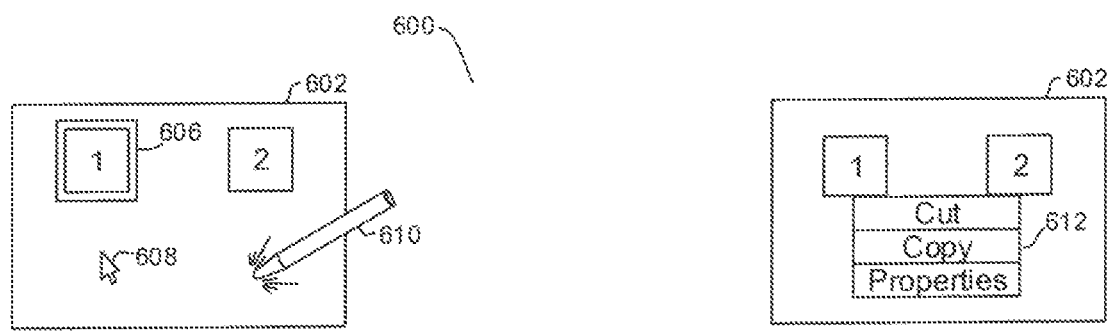

Moving on to FIG. 6, it also shows an example illustration 600 of present principles. First, a display 602 at the left portion of FIG. 6 is shown as presenting selector elements thereon (e.g. tiles, icons, files, etc.), including selector element one and selector element two. The device controlling the display 602 has identified area 606 comprising selector element one as an area of the display 602 being looked at by a user, the area 606 understood to not comprise the entire area of the display 602 on which images are presentable. It is to be understood that the box corresponding to the area 606 shown on the display 602 may not actually be presented thereon and is shown in FIG. 6 for illustration, though it is to also be understood that in some embodiments, such a box may actually be presented on the display 602. Note that the left portion of FIG. 6 shows a cursor 608 presented at another location of the display 602 other than the area 606.

Furthermore, note that the left portion of FIG. 6 shows that a stylus 610 has, under control of a user, contacted the display 602 at an area thereof that is different from both the area 606 and where the cursor 608 is presented. Responsive to this contact of the stylus 610 with the display 602 while the user looks at selector element one, and without additional input from a user, the right portion of FIG. 6 shows that a menu 612 (e.g. a menu that would otherwise be presented responsive to a right click selection, using a mouse, of element one) has been presented on the display 602 by the device controlling the display 602. Thus it is to be understood that, in some embodiments, when a particular element presented on a display is being looked at while an input device contacts an area of the display other than where the element is presented and other than where the cursor is presented, a function that would otherwise be associated with a right click of a mouse over the portion of the display presenting the element may be executed.

Figure 7:
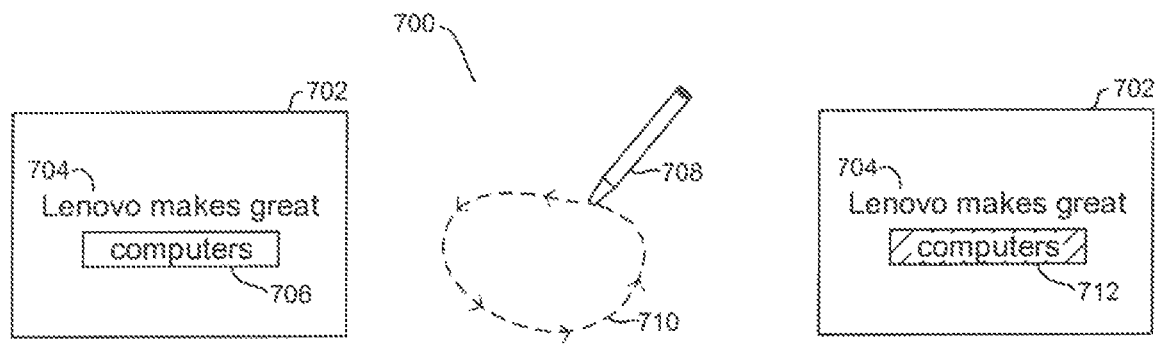

Reference is now made to FIG. 7, which shows an example illustration 700 of present principles. First, a display 702 at the left portion of FIG. 7 is shown as presenting information thereon, including text 704 comprising "Lenovo makes great computers." The device controlling the display 702 has identified area 706 comprising the word "computers" as an area of the display 702 being looked at by a user, the area 706 understood to not comprise the entire area of the display 702 on which images are presentable. It is to be understood that the box corresponding to the area 706 shown on the display 702 may not actually be presented thereon and is shown in FIG. 7 for illustration, though it is to also be understood that in some embodiments, such a box may actually be presented on the display 702.

In any case, after the text 704 is presented and the area 706 identified, the middle portion of FIG. 7 shows that a stylus 708 under control of a user has gestured in free space (e.g. in the air so that the stylus 708 does not contact anything other than the user himself or herself at the point where the user is holding the stylus 708), using at least one at least partially curved stroke, an imperfect circle 710 in the direction indicated by the arrows shown along the circle 710. In response to receipt of input from the stylus 708 generated from a motion sensor in the stylus 708 based the curved strokes in free space, and without additional input from a user, the right portion of FIG. 7 shows that the device controlling the display 702 has caused the display 702 to present highlighting 712 of the word "computers" such that the word "computers" is highlighted differently relative to the rest of the display and/or text 704 presented thereon. For example, the background of the display 702 may be white, the text 704 may be black, and the highlighting 712 presented on the display 702 may be neon yellow. Thus, it is to be understood in accordance with FIG. 7 that the device recognizes e.g. at least partially drawn imperfect circles using a stylus as a command to highlight a word being looked at.

Figure 8:
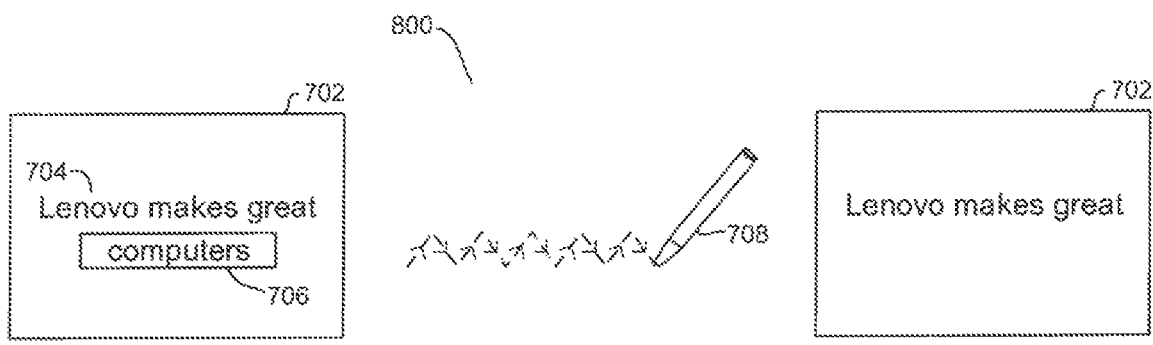

FIG. 8 shows an example illustration 800 of present principles, where the display 702 at the left portion of FIG. 8 is shown with the text 704 thereon, and again the device controlling the display 702 has identified area 706 comprising the word "computers" as an area of the display 702 being looked at by a user. In contrast to FIG. 7, after the text 704 is presented and the area 706 identified, the middle portion of FIG. 8 shows that the stylus 708 under control of the user has gestured in free space plural strokes in e.g. alternating at least substantially similar directions (represented by the arrows shown in the middle portion) in an uninterrupted and/or constant gesture to mimic a scribble of the stylus (e.g. against a surface). However, it is to be understood that such a scribble in free space need not necessarily be gestured in alternating at least substantially similar directions without pausing performance of the gesture in between, and that e.g. gesturing at least two strokes in differing directions with at least one change in direction in between may be used in accordance with the example shown in FIG. 8. In other words, the gesture need not be a "scribble" as shown but nonetheless still be a gesture recognizable by the device (e.g. based on input from a motion sensor on the stylus 708) as a command to delete and/or remove from presentation on the display 702 the word "computers" being looked at by the user. In any case, responsive to receiving a gesture such as the one illustrated in the middle portion of FIG. 8 and without additional input from the user, the device controls the display 702 as shown at the right portion of FIG. 8 to remove the word "computers" from presentation at its previous location on the display 702.

Turning now to the left portion of FIG. 9, the display 702 is again shown with text presented as described above in reference to the right portion of FIG. 8, namely that the text shown on the display 702 comprises the words "Lenovo makes great" since the word "computers" was previously removed as discussed above. The middle portion of FIG. 9 illustrates that a user, while looking at an area 902 of the display 702, has gestured in free space (e.g. and without interruption in the middle of the gesture) cursive handwriting (e.g. which is recognizable by the device based on input from a motion sensor in the stylus 708), where the handwriting includes alphabetical characters establishing the word "phones." Responsive to receipt of the input from the stylus 708 which comprises the word "phones" (e.g. and identification of the word "phones" based on the input) and without additional input from the user, the right portion of FIG. 9 shows that the device presents on the display 702 a representation and/or tracing of the handwriting input at the area 902 being looked at for at least a portion of the time the gesture was being performed (e.g. a majority of the time, a threshold time, etc.).

Figure 9:
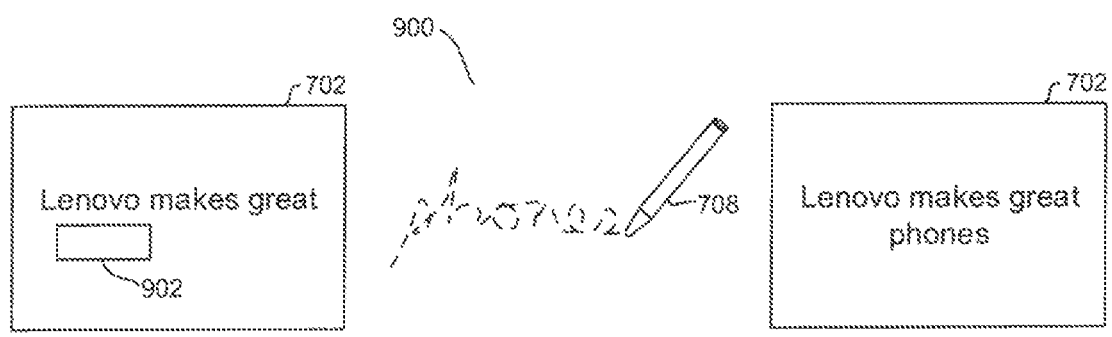
Figure 10:
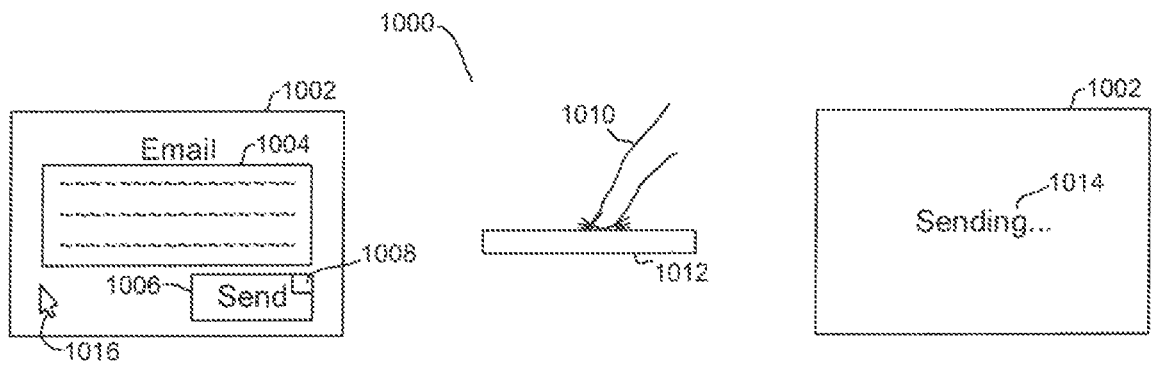

Before describing FIG. 10, it is to be understood in reference to FIGS. 7-9 that although the gestures using the stylus 708 have been described as being performed in free space (and hence sensed by a motion sensor such as an accelerometer in the stylus 708), it is to be understood that the gestures may also be gestured by contacting a tip of the stylus against a surface (and hence sensed by either or both of a motion sensor and contact sensor in the stylus 708). For instance, the word "phone" may be handwritten using the stylus against the top of a desk, and corresponding input may accordingly be generated by the stylus 708 and sent to the device controlling the display 702.

Continuing the detailed description in reference to FIG. 10, it shows an example illustration 1000 of present principles. First, a display 1002 at the left portion of FIG. 10 is shown as presenting a user interface (UI) for composition of an email, which includes a text entry box 1004 and a send selector element 1006 selectable to transmit the email. The device controlling the display 1002 has identified area 1008, which is an area of the display 1002 partially presenting but a portion of the selector element 1006, as an area of the display 1002 being looked at by a user. It is to be understood that the box corresponding to the area 1008 shown on the display 1002 may not actually be presented thereon and is shown in FIG. 10 for illustration, though it is to also be understood that in some embodiments, such a box may actually be presented on the display 1002.

In any case, the middle portion of FIG. 10 shows a user's finger 1010 contacting (e.g. tapping) an electronic pad 1012 configured to detect contact with an object such as a user (e.g. using capacitive touch sensors and/or motion sensors thereon) and transmit, to the device controlling the display 1002, input generated at the pad 1012 in response to the contact from the finger 1010. It is to be understood that though not shown, the electronic pad 1012 may be disposed on a surface of a desk e.g. proximate to the display 1002. Note that the left portion of FIG. 10 shows a cursor 1016 on the display 1002, but the device disregards the location of the cursor 1016 as a location which should correspond to the input generated by the user.

Instead, in response to receipt of the input from the pad 1012 generated based on contact of the finger 1010 with the pad 1012, and without additional input from a user, the device executes a function associated with selection of the element 1006 based on receipt of the input and identification of the area 1008 as a location being looked at by the user. In this case, the function is to transmit the email, and thus the right portion of FIG. 10 shows the display 1002 indicating 1014 that the message is being transmitted.

Figure 11:
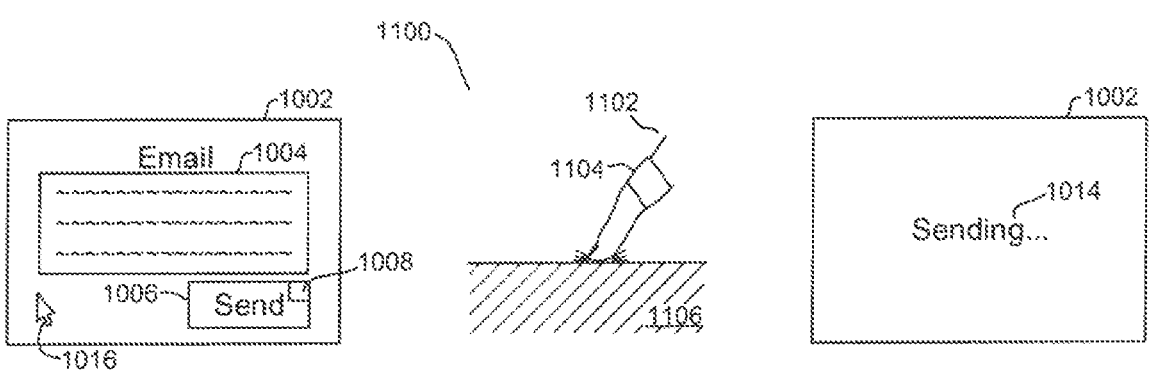

Now in reference to FIG. 11, it shows an example illustration 1100 of present principles. The display 1002 at the left portion of FIG. 11 is shown as presenting the user interface (UI) for composition of an email, again including a text entry box 1004 and a send selector element 1006 selectable to transmit the email. The device controlling the display 1002 has again identified the area 1008 as the area of the display 1002 being looked at by a user. The middle portion of FIG. 11 shows a user's finger 1102 bearing a wearable device 1104. The wearable device 1104 may sense e.g. muscle impulses generated by the finger 1102 and/or motion of the finger 1102 to identify when the finger 1102 taps a surface 1106 of e.g. a desk (e.g. going from movement to an abrupt halt of the movement), and responsive thereto the device 1104 may generate and transmit input to the device controlling the display 1002

Accordingly, in response to receipt of the input from the device 1104 and without additional input from a user (e.g. and regardless of the position of the cursor 1016), the device controlling the display 1002 executes the email transmission function (as illustrated at the right portion of FIG. 11) associated with selection of the element 1006 based on receipt of the input and identification of the area 1008 as a location being looked at by the user (e.g. rather than based on receipt of input from the pad 1012 as discussed above in reference to FIG. 10).

Figure 12:
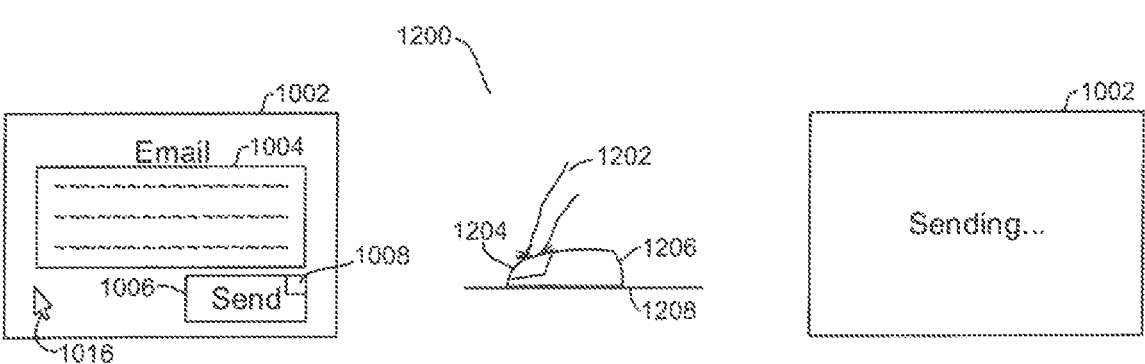

Providing another example illustration 1200 using the email UI discussed above, FIG. 12 shows the display 1002 at the left portion of FIG. 12 as presenting the user interface (UI) for composition of an email, again including a text entry box 1004 and a send selector element 1006 selectable to transmit the email. The device controlling the display 1002 has again identified the area 1008 as the area of the display 1002 being looked at by a user. In contrast to FIGS. 10 and 11, the middle portion of FIG. 12 shows a user's finger 1202 selecting a left click button 1204 of a mouse 1206 disposed on a surface 1208. In response to selection of the button 1204, the mouse 1206 generates and transmits corresponding input to the device controlling the display 1002.

Thus, in response to receipt of the input from the mouse 1206 and without additional input from a user (e.g. and regardless of the position of the cursor 1016), the device controlling the display 1002 executes the email transmission function (as illustrated at the right portion of FIG. 12) associated with selection of the element 1006 based on receipt of the left click mouse input and identification of the area 1008 as a location being looked at by the user.

Figure 13:
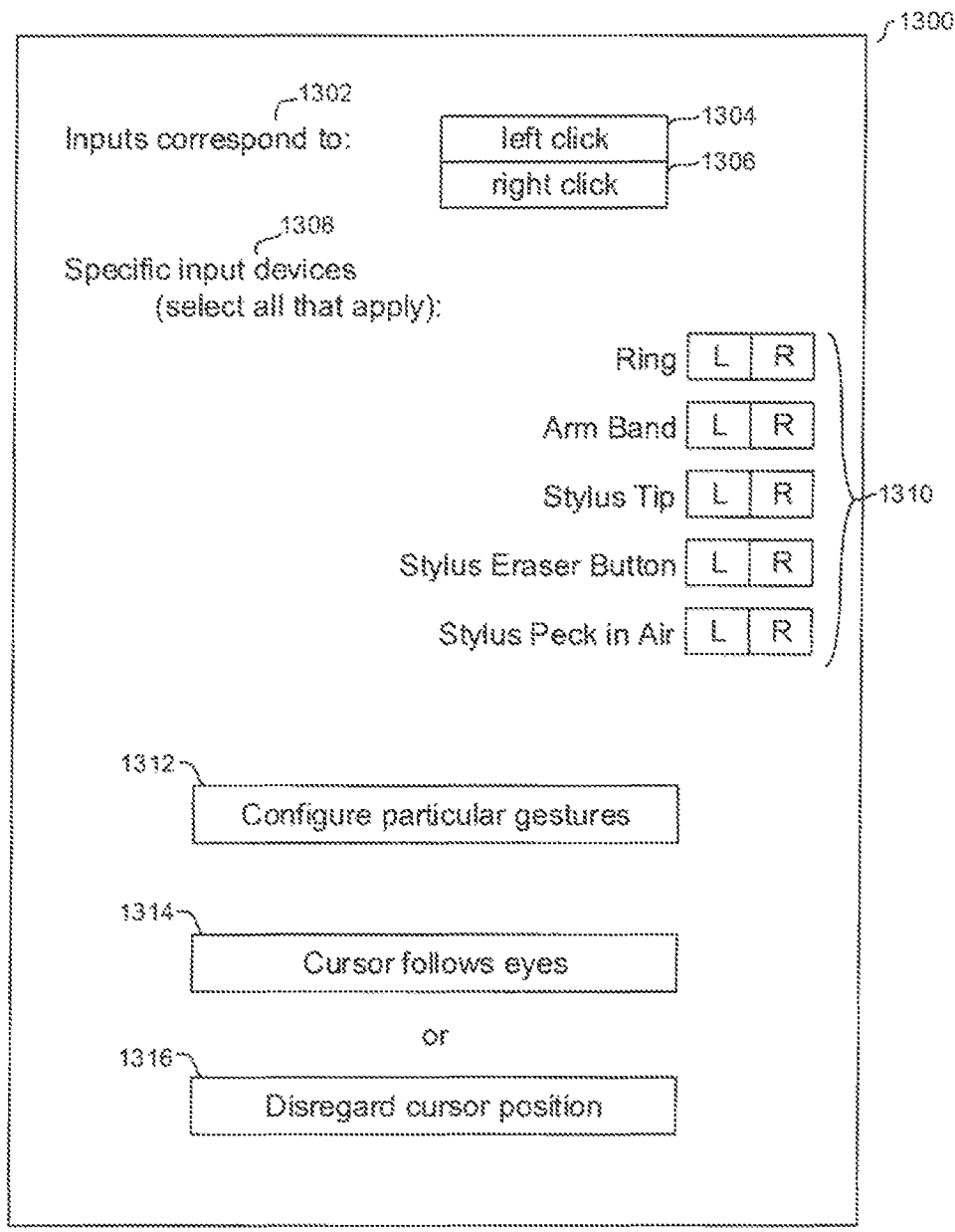
FIG. 13 is an example user interface (UI) in accordance with present principles.

Now in reference to FIG. 13, it shows an example user interface (UI) 1300 presentable on a display for configuring a device in accordance with present principles. The UI 1300 includes a first setting 1302 to configure the device to interpret (e.g. all) input from any input devices in communication with the device presenting the UI 1300 (e.g. an electronic pad, a wearable device, a stylus, and/or a mouse) as either left click input and/or input selecting an area being looking at by the user (based on selection of the selector element 1304), or right click input and/or input requesting a menu be presented at least proximate to an area being looking at by the user (based on selection of the selector element 1306).

The UI 1300 also includes a setting 1308 for a user to configure the device to interpret input from various devices based on the device from which the input was received, where respective left click and right click selector elements 1310 are shown as being associated with each device listed on the UI 1300 for selection by a user to configure the device to interpret input from that device as respectively either left click input and/or input selecting an area being looking at by the user, or right click input and/or input requesting a menu be presented at least proximate to an area being looking at by the user. As may be appreciated from FIG. 13, the devices for which configuration is available (e.g. based on those devices currently communicating with the device presenting the UI 1300) include a ring (a form of a wearable device), an arm band (another form of a wearable device), and a stylus for which three options are presented—one for a stylus contact sensor tip, one for a stylus "eraser" button, and one for stylus input generated based on gestures in free space. For example, using the UI 1300, the user may configure the device presenting the UI 1300 to interpret input generated based on the press of the stylus "eraser" button as left-click input (based on selection of the corresponding left-click selector element for that option) and to interpret input generated based contact of the sensor tip with another object as right-click input (based on selection of the corresponding right-click selector element for that other option).

Still in reference to FIG. 13, the UI 1300 also includes a selector element 1312 selectable to initiate configuration of the device to recognize particular gestures, to be gestured by the user during the configuration, as specific commands (e.g. a highlight command, a delete command, etc.). Still further, selector elements 1314 and 1316 are presented for a user to select one of the two elements 1314 and 1316 to respectively configure the device to automatically without further user input present a cursor on the display as following and/or tracking a user's eye focus toward a display as the focus shifts about the display, or to disregard cursor position and/or leave the cursor where it was previously presented based on other input means (e.g. manipulation of a mouse) and thus to not track on the display the movement of the user's direction of focus across the display using the cursor.

Without reference to any particular figure, it is to be understood that the wireless communication between the input devices described herein (e.g. a stylus, a wearable device, etc.) may be Bluetooth communication. Furthermore, although certain input devices have been described herein, present principles may be used in conjunction with still other input devices, such as e.g. a wearable Bluetooth headset and/or earpiece having a button thereon, where e.g. selection of the button on the headset while looking at a selector element is used to select the selector element. As another example, a smart phone or tablet may be the input device gestured in free space to provide input (e.g. generated from a motion sensor on the smart phone) to another device controlling a display in accordance with present principles, even if e.g. the display of the smart phone is not illuminated. For instance, a user may look at an input field of a fillable website form and gesture handwriting using the smart phone, and the other device may receive such input and insert characters into the active field which correspond to the handwriting input. Even further, in some embodiments the smart phone display may be illuminated with a single electronic button presented thereon (e.g. an "easy" button), where selection of the button may cause different functions to be executed at the other device depending on what a user is looking at on the display.

It may now be appreciated that present principles provide for e.g. using a combination eye tracking and input generated from a sensor on an input device to execute a function at another device. Examples of providing such input include taping a pen tip on-screen while looking at another location on the screen, tapping a pen tip off-screen while looking at a specific location on the screen, pushing a pen eraser button while looking at a specific location on the screen, and pushing a pen button while simultaneously tapping the pen tip off screen (e.g. which may be interpreted as right-click input, whereas just pushing the pen or tapping its tip but not simultaneously may be interpreted as left-click input).

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular EXECUTION OF FUNCTION BASED ON LOCATION OF DISPLAY AT WHICH A USER IS LOOKING AND MANIPULATION OF AN INPUT DEVICE is herein shown and described in detail, it is to be understood that the subject matter which is encompassed by the present application is limited only by the claims.

What is claimed is:

1. An apparatus, comprising:
   at least one processor;
   a sensor accessible to the at least one processor;
   a display accessible to the at least one processor; and
   storage accessible to the at least one processor and bearing instructions executable by the at least one processor to:
   receive first input from the sensor;
   based on the first input, identify a location on the display at which a user is looking;
   receive second input from a first input device in communication with the apparatus;
   responsive to receipt of the second input and based on the location on the display, execute a function at the apparatus; and
   present, on the display, a user interface (UI) comprising a first selector element that is selectable to enable the at least one processor to identify input from the first input device as left click input to select a display location at which the user is looking, the UI comprising a second selector element that is selectable to enable the at least one processor to identify input from the first input device as right click input to select a display location at which the user is looking.

2. The apparatus of claim 1, wherein the first input device is a stylus, and wherein the second input is from at least one of a motion sensor on the stylus and a contact sensor on the stylus.

3. The apparatus of claim 1, wherein the function is replacement of a first word presented on the display with a second word different from the first word, and wherein the instructions are executable by the at least one processor to:
   receive third input from the first input device subsequent to receipt of the second input; and
   responsive to receipt of the third input and based on the location on the display, replace the second word presented on the display with a third word different from the first word and different from the second word.

4. The apparatus of claim 1, wherein an element is presented at the location on the display, and wherein the function is associated with selection of the element.

5. The apparatus of claim 1, wherein the function is presentation of a menu on the display, and wherein the second input is received at an area of the display not comprising the location on the display.

6. The apparatus of claim 1, wherein the function is to highlight text presented on the display, and wherein the function is executed at least in part based on detection of a gesture of at least one at least partially curved stroke one or more of: in free space, and against a surface other than the display.

7. The apparatus of claim 1, wherein the function is presentation, at the location on the display, of a representation of at least one character detected as gestured one or more of: in free space, and against a surface other than the display.

8. The apparatus of claim 7, wherein the location on the display is identified as an input field at which the user is looking, and wherein the representation of the at least one character is presented at the input field.

9. The apparatus of claim 1, and wherein the instructions are executable by the at least one processor to:
   responsive to receipt of third input from the first input device and responsive to an inability to identify a display location at which the user is looking, execute a function at the apparatus that is associated with an element presented at a display location at which the cursor is currently presented.

10. The apparatus of claim 1, and wherein the instructions are executable by the at least one processor to:
    responsive to receipt of third input from the first input device and responsive to an inability to identify a display location at which the user is looking, decline to execute a function at the apparatus.

11. The apparatus of claim 1, wherein left click input corresponds to a left click of a mouse, and wherein right click input corresponds to right click input of a mouse.

12. A method, comprising:
    receiving first input from a camera;
    identifying, based on the first input, a location of a display at which a person is looking;
    receiving second input from a first input device;
    performing, based at least in part on the location of the display and responsive to receiving the second input, an operation at a device; and
    presenting, on the display, a user interface (UI) comprising a first selector element that is selectable to enable, while eye tracking is performed, identification of input from the first input device as left click input to select a display location at which the person is looking, the UI comprising second selector element that is selectable to enable, while eye tracking is performed, identification of input from the first input device as right click input to select a display location at which the person is looking.

13. The method of claim 12, comprising:
    identifying the second input as input from an electronic button on the first input device, wherein the operation is performed based at least in part on the identifying of the second input as input from the electronic button.

14. The method of claim 12, comprising:
    identifying the second input as input from an accelerometer on the first input device, wherein the operation is performed based at least in part on the identifying of the second input as input from the accelerometer.

15. The method of claim 12, comprising:
    performing, responsive to receipt of third input from the first input device and responsive to not identifying a display location at which a person is looking, an operation at the device that is associated with an element presented at a display location at which the cursor is currently presented.

16. The method of claim 12, wherein left click input corresponds to left click input using a mouse, and wherein right click input corresponds to right click input using a mouse.

17. Apparatus comprising:
    a first processor;
    a network adapter;
    storage bearing instructions executable by a second processor for:
    performing a task using the second processor responsive to identification of a user looking at an area of a display and responsive to receipt of input generated based on manipulation of a first input device; and
    presenting, on the display, a user interface (UI) comprising a first selector element that is selectable to enable, while eye tracking is performed, the second processor to identify input from the first input device as left click input to select a display area at which the user is identified as looking, the UI comprising a second selector element that is selectable to enable, while eye tracking is performed, identification of input from the first input device as right click input to select a display area at which the user is identified as looking, the first selector element being different from the second selector element;

wherein the first processor transfers the instructions over a network via the network adapter.

18. The apparatus of claim 17, wherein the instructions are executable by the second processor for:

presenting, on the UI, a third selector element that is selectable to enable use of input from a wearable input device to perform tasks based on input from the wearable input device and identification of the user looking at a particular area of the display.

19. The apparatus of claim 18, wherein the instructions are executable by the second processor for:

presenting, on the UI, a fourth selector element that is selectable to enable use of input from a stylus input device to perform tasks based on input from the stylus input device and identification of the user looking at a particular area of the display, the stylus input device being different from the wearable input device.

20. The apparatus of claim 17, wherein left click input corresponds to a left click of a mouse, and wherein right click input corresponds to right click input of a mouse.

* * * * *